United States Patent [19]
Depfenhart

[11] Patent Number: 5,300,925
[45] Date of Patent: Apr. 5, 1994

[54] PROCESS AND APPARATUS FOR MONITORING OF VEHICLE CRAWLER CHAINS OF A VEHICLE DURING DRIVING

[75] Inventor: Friedrich Depfenhart, Heimsheim, Fed. Rep. of Germany

[73] Assignee: Dr. Ing. h.c.F. Porsche AG, Fed. Rep. of Germany

[21] Appl. No.: 855,889

[22] Filed: Mar. 23, 1992

[30] Foreign Application Priority Data

Mar. 21, 1991 [DE] Fed. Rep. of Germany ........ 4109257

[51] Int. Cl.$^5$ ............................................. G08B 21/00
[52] U.S. Cl. ..................................... 340/676; 340/679; 340/439
[58] Field of Search ............................... 198/810, 502.1; 474/148, 150, 152, 153, 901, 902; 340/676, 684, 679, 439; 318/460; 73/162

[56] References Cited

U.S. PATENT DOCUMENTS

| | | | |
|---|---|---|---|
| 3,095,532 | 6/1963 | Floyd | 318/460 |
| 5,103,213 | 4/1992 | Marsh | 340/671 |

FOREIGN PATENT DOCUMENTS

| | | | |
|---|---|---|---|
| 0011264 | 5/1980 | European Pat. Off. | |
| 1812639 | 4/1978 | Fed. Rep. of Germany | |
| 208332 | 8/1982 | Fed. Rep. of Germany | 198/810 |
| 3701087 | 7/1988 | Fed. Rep. of Germany | |
| 3923975 | 1/1991 | Fed. Rep. of Germany | |

Primary Examiner—Hezron E. Williams
Assistant Examiner—Christine K. Oda
Attorney, Agent, or Firm—Evenson, McKeown, Edwards & Lenahan

[57] ABSTRACT

A process and apparatus monitors vehicle crawler chains for malfunctions during the driving operation. In particular, the process and apparatus monitors unacceptable changes of the pitch of the crawler chain which impairs the driving operation. The actual running sound of a crawler chain is sensed and is compared with the median running sound. When the actual running sound exceeds the median running sound by more than a given percentage and this excess occurs in the case of at least one chain link with a frequency that is higher than a given frequency, a warning signal is emitted to the driver.

9 Claims, 3 Drawing Sheets

PROCESS AND APPARATUS FOR MONITORING OF VEHICLE CRAWLER CHAINS OF A VEHICLE DURING DRIVING

BACKGROUND AND SUMMARY OF THE INVENTION

This present invention relates to a process and apparatus for monitoring vehicle crawler chains to detect a malfunctioning during the driving operation, and, more particularly, to a product and apparatus configured such that in the driving operation a defect signal for each crawler chain is triggered by an actual running sound of a defective crawler chain which exceeds a median running sound of a properly operating crawler chain. The defect signal is assigned to a pitch of the crawler chain for triggering the signal. A warning signal is emitted when a given pitch signal frequency is exceeded.

Crawler chains are highly stressed vehicle parts which are subjected to wear. The failure of these chains leads to an inability to maneuver the vehicle and renders the vehicle uncontrollable. Although a defect on the crawler chain has an acoustic effect, it can not necessarily be heard in a vehicle equipped with a crawler chain because of the high noise level which usually exists there.

It is an object of the present invention to provide a process and a device for monitoring vehicle crawler chains for defects during driving of the vehicle.

This object has been in accordance with the present invention by early recognition and indication of an unacceptable change of pitch of the crawler chain caused, for example, by an incipient crack in the case of a continuous rubber belt crawler chain as described in German Patent DE-A-39 23 975. The vehicle can therefore still be maneuvered when a defect signal occurs and can move to a repair facility under its own power. The safety of the vehicle occupants is increased by the fact that a crack of the crawler chain that is caused by wear or by other exterior influences can no longer occur unexpectedly and that thus critical driving conditions are largely avoided.

The invention excludes an erroneous triggering, which may occur as a result of accidental events, such as rocks in the crawler chain, in that it is examined whether the signal for one of the links of the continuous rubber belt crawler chain which corresponds to an increased running sound exceeds a given frequency.

BRIEF DESCRIPTION OF THE DRAWINGS

These and other further object, features and advantages of the present invention will become more apparent from the following detailed description of a currently preferred embodiment when taken in conjunction with the accompanying drawings wherein.

DETAILED DESCRIPTION OF THE DRAWINGS

Figure 1:
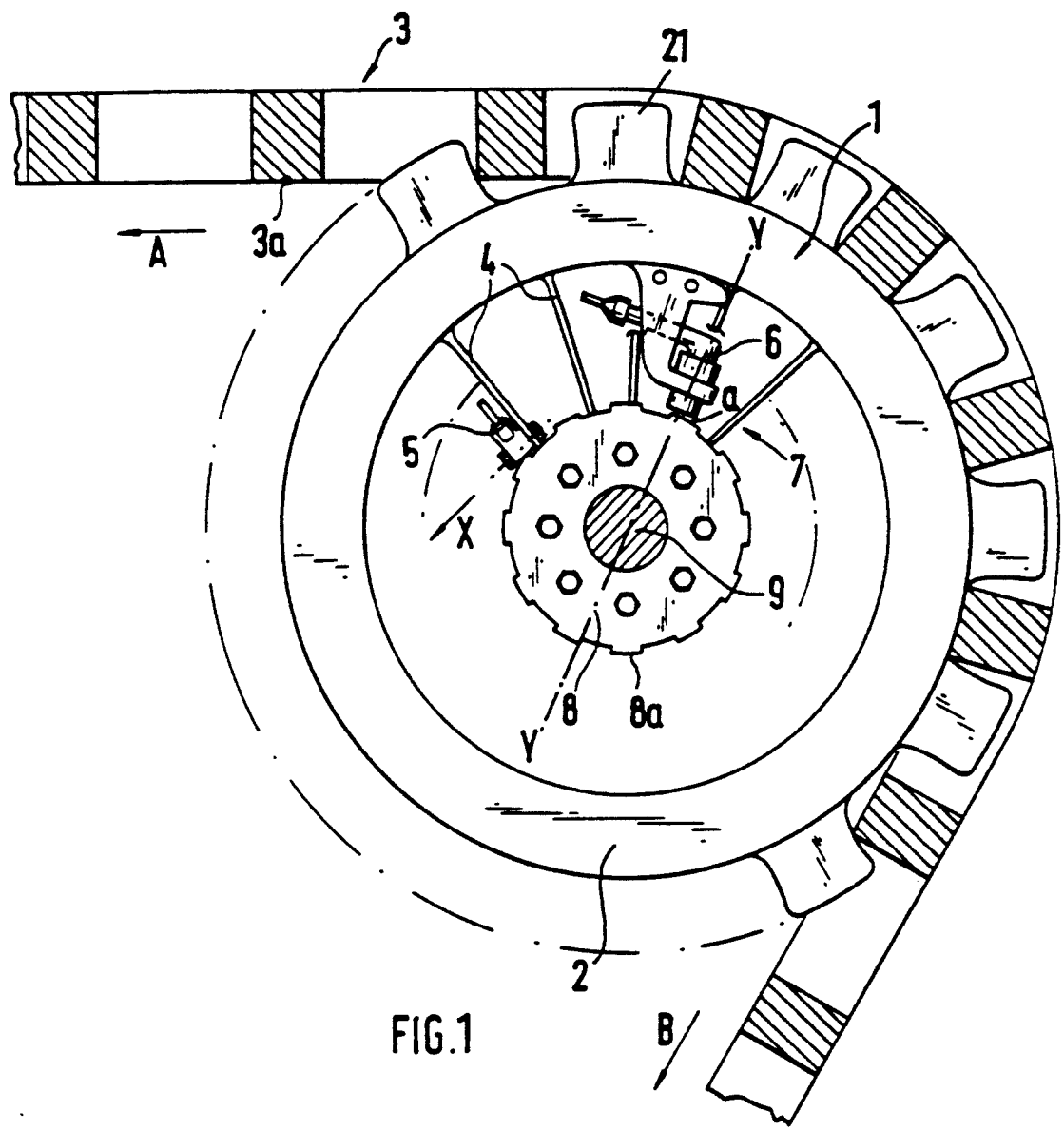
FIG. 1 is an elevation view of an end power take-off housing of a vehicle equipped with a continuous rubber belt crawler chain with a device operating according to the present invention.
Figure 3B:
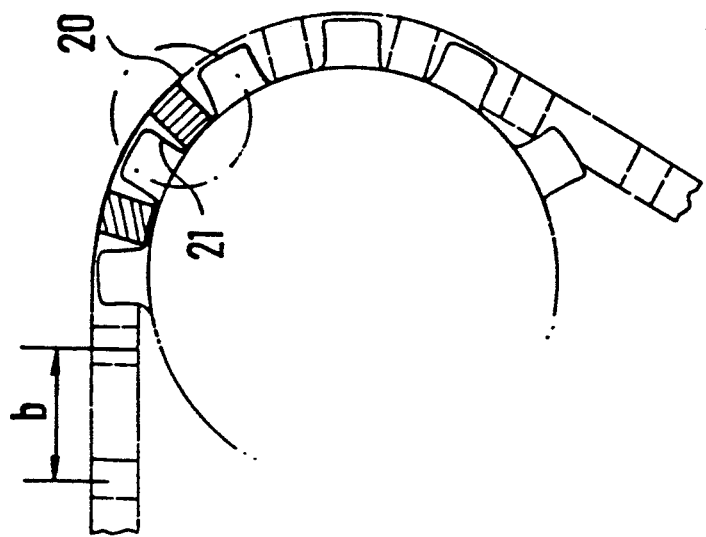
FIGS. 3A and 3B are schematic representations of a defective continuous rubber belt crawler chain entering onto a driving gear.

FIG. 1 shows the inside of a front face of an end power take-off housing 1 having a driving gear 2 and a continuous rubber belt crawler chain 3 placed thereon which has a pitch b (FIG. 3B) which, in the case of this type of chain, is determined by traverses on which the meshing of the driving gear 2 takes place. A swing acceleration sensor 5 is disposed on a rib 4 of the end power take-off housing 1. This swing acceleration sensor 5 is arranged such that its axis of the highest sensitivity X is aligned so that the running sound causes a maximal signal in the swing acceleration sensor 5. This is particularly true in the case of a center alignment between the direction of the load run A and the direction of the load run B. An inductive sensor 6 of a rotary pulse generator designated generally by the numeral 7 is disposed above a pulse ring 8 which is non-rotatably connected with a drive shaft 9, i.e. rotates fixed to the shaft 9. A pulse label or tab 8a on the pulse ring 8 is assigned to or corresponds with each tooth 21 of the driving gear 2.

Figure 2:
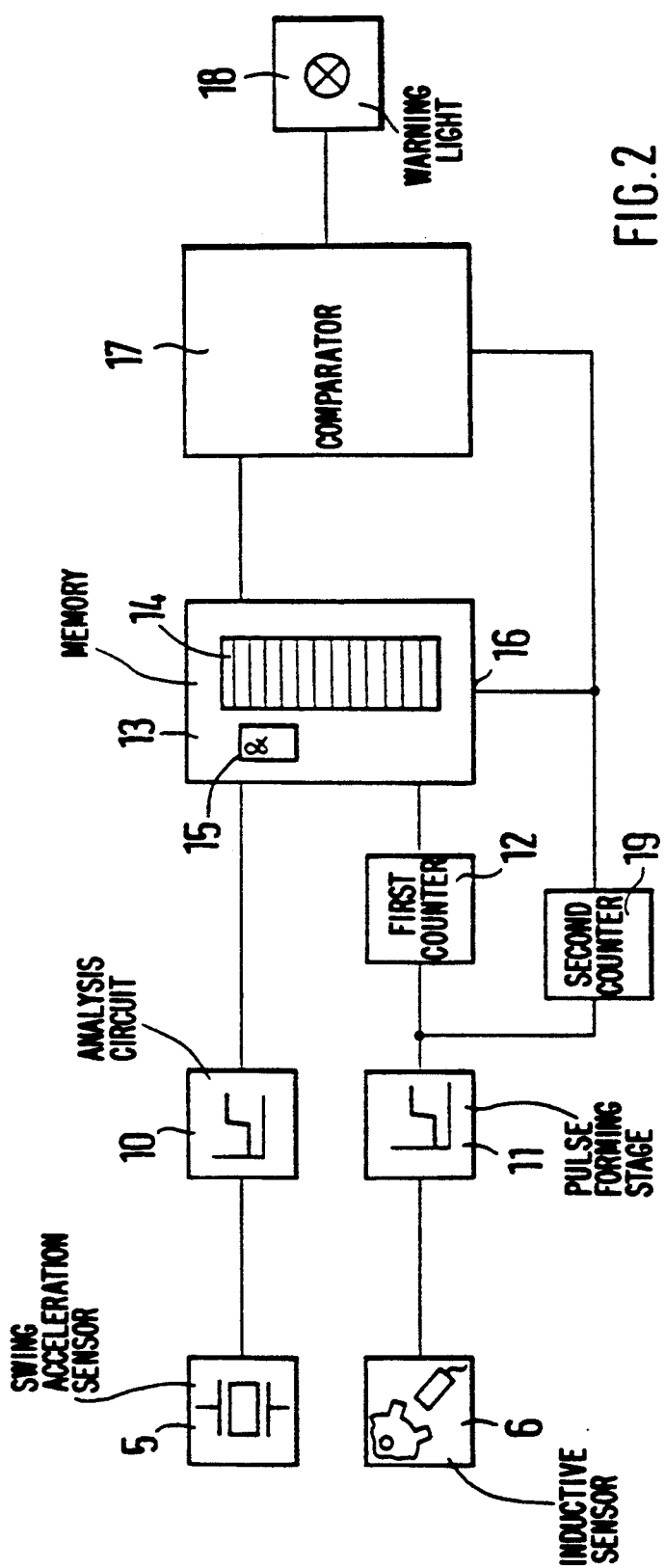
FIG. 2 is a diagram for an analysis circuit of the device of the present invention.

An analysis circuit 10 is connected behind the swing acceleration sensor 5 shows in FIG. 2. A pulse forming stage 11, the output signal of which is led on a first counter 12, is connected with the inductive sensor 6. This counter 12 addresses a memory 13 which comprises as many storage locations 14 as the continuous rubber belt crawler chain 3 has pitches. The individual storage locations 14 are connected with the input of the memory 13 of the analysis circuit 10 by way of an adding stage 15. When a signal is present at the analysis circuit 10, the adding stage 15 increase by one the value of the addressed storage location 14. The content of the storage locations 14 is available at the output of the memory 13. All storage locations 14 may be set to zero by way of a reset input 16. The output of the memory 13 is connected with a comparator 17 which emits a warning signal when a signal is present at an enable input of the comparator 17 and the value present at the output of the memory 13 exceeds a given value. The warning signal controls, for example, a warning light 18 situated in the driver's cab.

A second counter 19 counts the pulses of the pulse forming stage 11 and emits a signal when a given value is reached. On one hand, this signal is present at the enable input of the comparator 17 and, on the other hand, sets all storage locations 14 to zero by way of the reset input 16 of the memory 13.

Figure 3A:
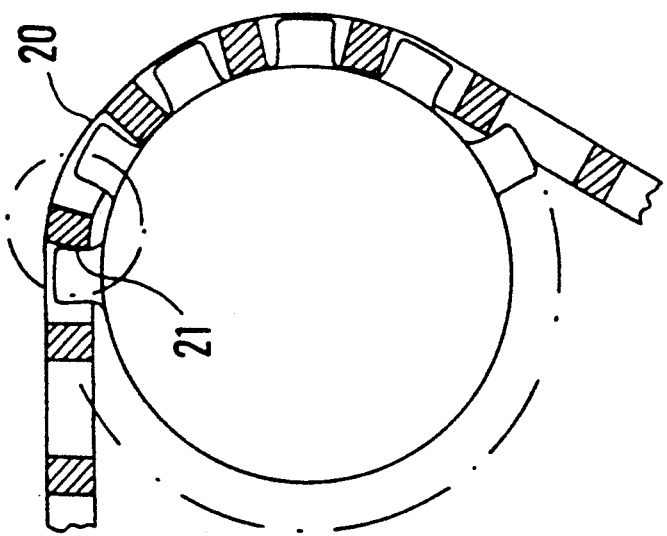

A failure of a crawler chain 3 is preceded by the fact that the tensile forces of the steel cables which have been cracked by wear or damage can no longer be transmitted completely. The above-mentioned German Patent DE-A-39 23 975 describes in detail how tensile forces can still be transmitted along a limited driving course by way of catch hooks on the chain guiding links. In the case of a defect, the crawler chain 3 will then have a pitch error 20 (FIG. 3A and 3B) at this point. When this error is gripped by a tooth 21 of the driving gear 2, a striking sound is generated and can be transmitted by way of the drive shaft 9 to the end power take-off housing 1. The sound is detected by the swing acceleration sensor 5 and compared in the analysis circuit 10 with the median running sound of the crawler chain 3 determined from the last rotation. When the median running sound is exceeded by a given percentage, for example, as a function of the speed, the analysis circuit 10 will emit a signal.

Meanwhile, the first counter 12 counts the signals furnished by the pulse forming stage 11 and by the inductive sensor 6, and always restarts its counting with one as soon as it has reached a value which corresponds to the number of pitches of the entire crawler chain 3. As a result, the counter 12 assigns a number to each chain pitch and thus determines its rotational position. The count of the counter 12 addresses the storage locations 14 in the memory 13 so that a storage location 14 is assigned to each chain pitch which adds up the signals of the analysis circuit 10. The sums added up in the storage locations 14 are available at the output of the memory 13 and are fed to a comparator 17.

A second counter 19 counts the pulses of the pulse forming stage 11 until an integral multiple of the number of pitches of the entire continuous rubber belt crawler chain 3 has been reached. This counter 19 then emits a signal by which the comparator 17 is enabled by way of its enable input, and by way of the reset input 16, all storage locations 14 are set to zero. By virtue of the present enable signal, the comparator 17 checks whether the values stored in the storage locations 14 exceed a given value. If this is the situation at least once, the comparator 17 emits a signal which causes the warning light 18 to light up and thus signals a malfunctioning of the crawler chain to the driver. In further contemplated embodiments, it may also be provided that the warning light be replaced by indicating the warning signal to the driver present in the driver's cab in a different manner either visually, acoustically or haptically.

In a further unillustrated embodiment of the invention, an integral number n of pulse labels or tabs 8a is assigned to each tooth of the driving gear 2, the counter 12 counts to n-times the number of pitches of the entire continuous rubber belt crawler chain 3, and counter 19 counts to n-times the integral multiple of the number of pitches of the entire continuous rubber belt crawler chain.

In yet another particularly advantageous further development of the present invention the percentage of the excess of the median running sound required for triggering a signal at the analysis circuit 10 is not firmly set but is selected as a function of the driving speed. As a result, the influences of the natural resonance of the crawler chain, of the speed-dependent proportion of the running sound and of similar phenomena can be reduced considerably, and the triggering reliability of the monitoring device can be increased significantly. Moreover, a monitoring device may be provided on each crawler chain of the vehicle.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A process for monitoring at least one vehicle crawler chain for malfunctions during a driving operation with respect to an unacceptable change of pitch of links of the crawler chain so as to impair the driving operation, comprising the steps of monitoring an actual running sound of said crawler chain, triggering a defect signal for said crawler chain, when said unacceptable change of pitch occurs during the driving operation, due to said defect signal exceeding a median running sound of an intact crawler chain, assigning to the median running sound a threshold pitch of the crawler chain to trigger the defect signal, and emitting a warning signal when a given signal frequency associated with the unacceptable change of pitch is above the threshold pitch, wherein the given signal frequency is determined by generating a number of n-pulsed for each tooth of the driving gear which correspond to each pitch of the crawler chain, counting the thus generated pulses to obtain a count, starting the counting again at one, when a value is reached which corresponds to n-times the number of all the pitches of the crawler chain, using the count for determining the rotating position of the pitches of the crawler chain, and adding up separately for each of the links of the crawler chain the number of said defect signals during a given time period.

2. The process according to claim 1, wherein the step of triggering said defect signal includes operatively arranging a swing acceleration sensor on an end power take-off housing for a driving gear to sense a signal corresponding to the actual running sound of the crawler chain, operatively arranging an analysis circuit to filter portions out of the signal of the actual running sound which exceed the median running sound, and operatively arranging a monitoring device to emit the defect signal when said threshold frequency is exceeded and to determine a rotating position of the pitches of the chain from the signal of a rotary pulse generator connected with the driving gear.

3. A device for monitoring crawler chains of a vehicle to determine an unacceptable change of pitch of the crawler chains which impair driving of the vehicle, comprising a rotary pulse generator having an inductive sensor mounted on an edge of an end power take-off housing and a pulse ring firmly connected to a drive shaft of the driving gear around which the crawler chains pass, and the pulse ring for each tooth of the driving gear having at least one of an integral number of pulse members, the longitudinal axis of the inductive sensor being arranged in a radial plane extending perpendicularly to an axis of the drive shaft so as to intersect therewith, and the inductive sensor is spaced by a short distance opposite the pulse members.

4. A device for monitoring a crawler chain of a vehicle to determine an unacceptable pitch of the crawler chain which impairs driving of the vehicle, comprising a swing acceleration sensor operatively arranged on an end power take-off housing for a driving gear to sense a signal corresponding to an actual running sound of the crawler chain, an analysis circuit arranged to filter portions out of the signal of the actual running sound which exceed a medial running sound, and a monitoring device operatively associated with the analysis circuit to emit a defect signal when a frequency associated with the unacceptable pitch of the crawler chain exceeds a given frequency associated with the median running sound and to determine a rotating position of pitches of the chain from a signal of a rotary pulse generator connected to the driving gear, wherein the swing acceleration sensor is arranged on a rib of the end power take-off housing inside a housing recess and has an axis of highest sensitivity aligned such that the median running sound causes a maximum signal in the swing acceleration sensor.

5. The device according to claim 4, wherein the rotary pulse generator comprises an inductive sensor mounted on the edge of said end power take-off housing and a pulse ring firmly connected to a drive shaft of the driving gear around which the crawler chain passes, and the pulse ring for each tooth of the driving gear having at least one of an integral multiple of pulse members associated therewith, the longitudinal axis of the inductive sensor being arranged in a radial plane extending perpendicularly to an axis of the drive shaft so as to intersect therewith, and the inductive sensor being spaced opposite the pulse members.

6. The device according to claim 4, wherein the monitoring device comprises a first counter arranged to count pulses of the rotary pulse generator and set to one when the pulse count of the first counter corresponds to n times the number of all pitches of the crawler chain, a second counter arranged to count the pulses of the rotary pulse generator and to emit a signal when the pulse count of the second counter correspond to n times a given integral multiple of the number of all pitches of the crawler chain, storage locations which correspond to the number of all pitches of the crawler chain which are addressed by the count of the first counter and which, during an active phase, count the number of defect signals emitted by the swing acceleration sensor, and a comparator operatively configured and associated with the storage location and the second counter such that, after the triggering by the signal of the second counter, the comparator examines the value in the storage locations assigned to the chain pitches, emits a warning signal when the number of defect signals exceeds a given value, and sets all said storage locations to zero.

7. The device according to claim 6, further comprising a rotary pulse generator having an inductive sensor mounted on an edge of an end power take-off housing and a pulse ring firmly connected to a drive shaft of the driving gear around which the crawler chain passes, and the pulse ring for each tooth of the driving gear having at least one of an integral multiple of pulse members associated therewith, the longitudinal axis of the inductive sensor being arrange din a radial plane extending perpendicularly to an axis of the drive shaft so as to intersect therewith, and the inductive sensor being spaced opposite the pulse members.

8. The device according to claim 4, wherein a warning signal is transmitted by at least one of visual, acoustical and haptical to a driver when the defect signal is emitted.

9. The device according to claim 8, wherein the monitoring device comprises a first counter arranged to count pulses of the rotary pulse generator and set to one when the pulse count of the first counter corresponds to n times the number of all pitches of the crawler chain, a second counter arranged to count the pulses of the rotary pulse generator and to emit a signal when the pulse count of the second counter corresponds to n times a given integral multiple of the number of all pitches of the crawler chain, storage locations which correspond to the number of all pitches of the crawler chain which are addressed by the count of the first counter and which, during an active phase, count the number of defect signals emitted by the swing acceleration sensor, and a comparator operatively configured and associated with the storage location and the second counter such that, after the triggering by the signal of the second counter, the comparator examines the value in the storage locations assigned to the chain pitches, emits a warning signal when the number of defect signals exceeds a given value, and sets all said storage locations to zero.

* * * * *